United States Patent [19]

Klein

[11] 4,207,378
[45] Jun. 10, 1980

[54] EXPANDED STYRENE-POLYMERS AND POLYOLEFIN MICRO-BITS AND THEIR PREPARATION

[76] Inventor: Max Klein, 257 Riveredge Rd., Tinton Falls, N.J. 07724

[21] Appl. No.: 833,644

[22] Filed: Sep. 15, 1977

Related U.S. Application Data

[63] Continuation-in-part of Ser. No. 342,535, Mar. 16, 1973, abandoned.

[51] Int. Cl.² .............................................. B32B 27/40
[52] U.S. Cl. ................................... 428/402; 428/407; 521/918
[58] Field of Search ............... 428/402, 407, 357, 523; 260/2.5 B; 521/918

[56] References Cited

U.S. PATENT DOCUMENTS

| | | | |
|---|---|---|---|
| 2,983,692 | 5/1961 | D'Alelio | 260/2.5 B |
| 3,255,127 | 6/1966 | Von Bonin | 260/2.5 B |
| 3,371,053 | 2/1968 | Raskin | 260/2.5 B |
| 3,472,801 | 10/1969 | Lerman et al. | 260/2.5 B |
| 3,607,999 | 9/1971 | Corbett et al. | 428/407 |
| 3,630,820 | 12/1971 | Leach | 428/402 |

*Primary Examiner*—William R. Dixon, Jr.
*Attorney, Agent, or Firm*—A. A. Orlinger

[57] ABSTRACT

Involved are (I) expanded, thermoplastic, non-brittle as expanded polymers selected from a styrene-polymer and a polyolefin from polyethylene to poly-methylpentene, said expanded polymer being in form of micro-bits which (a) are from about 40 to about 325 microns long and from about 20 to about 325 microns wide, (b) are substantially completely to entirely completely free (i) of intact cells of expanded polymer bit-pieces from which they were produced and of (ii) any uniformity in outline of individual micro-bit particles, and (c) in density are from about 85 percent of, to about substantially the same as, the specific unexpanded polymer from which there was provided the aforesaid expanded polymer, and (II) a method of preparing these micro-bits by impelling a mixture of them in water in a confined comminuting zone through a circular path by repeated impact by a plurality of impact surfaces spaced axially and radially at apart from one another and rotated about the circular path's axis from about 4700 to about 8000 r.p.m. thereby driving the bit-pieces against cornered edges of a plurality of from circular to substantially rectangular orifices arranged in screening array in an arcuate plane, thus repeatedly tearing, ripping and shearing the desired micro-bits from bit-pieces of the starting expanded polymer.

18 Claims, 16 Drawing Figures

EXPANDED STYRENE-POLYMERS AND POLYOLEFIN MICRO-BITS AND THEIR PREPARATION

This application is a continuation-in-part of application Ser. No. 342,535 filed Mar. 16, 1973 now abandoned.

This invention is that of (a) micro-bits of an expanded thermoplastic polymer which is non-brittle in its expanded form and selected from a styrene-polymer, a polyethylene, polypropylene, a polybutene, and a polymethylpentene, and (b) a method for preparing these micro-bits from bit-pieces of the respective styrene-polymer or polyolefin from polyethylene to the polymethylpentene.

These micro-bits, which briefly may be called expanded styrene-polymer or expanded polyolefin micro-bits, of the invention (i) range in size from about 325 microns in length and also from possibly about the same in width down to about 40 microns or less in length and to about 20 microns or less in width, (ii) have a specific gravity of from about 85 percent, to about the same as that, of the starting polymer which was expanded and then disintegrated into the micro-bits; (iii) are from substantially completely to entirely completely free of intact cells of the expanded polymer from which they were produced and (iv) their particles lack uniformity in outline.

Figure 1:
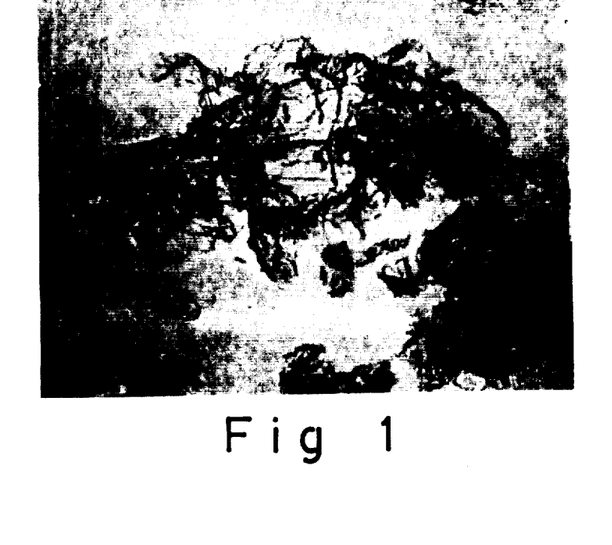
FIG. 1 is a photomicrograph at a magnification of 161 times, by transmitted light.
Figure 13:
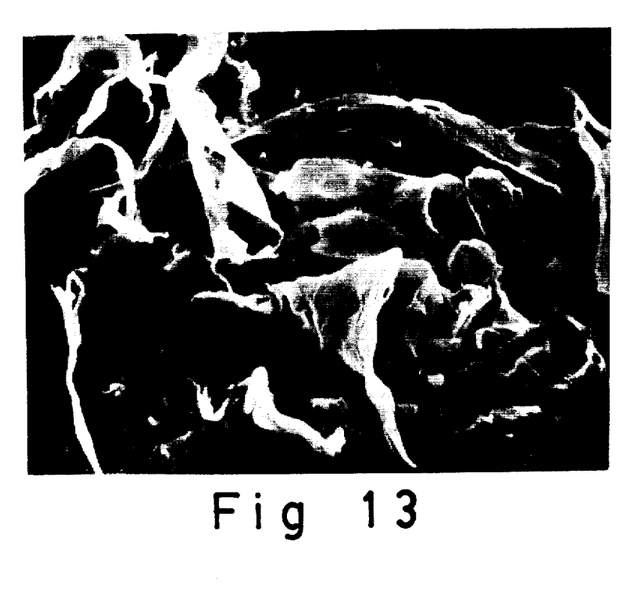
FIG. 13 is a SEM photomicrograph taken at magnification of 380 times of the same polyethylene micro-bits involved in FIGS. 10 to 12.
Figure 14:
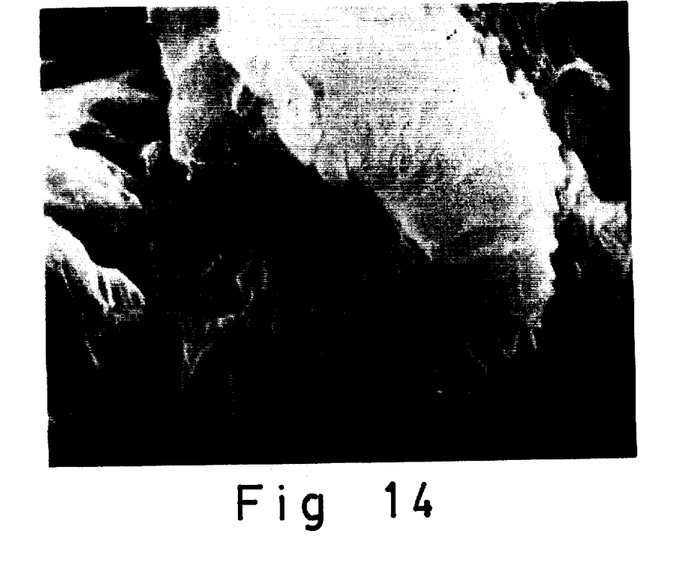
FIG. 14 is a SEM photomicrograph taken at magnification of 10,000 times of polystyrene micro-bits.

Viewed (a) at a magnification of, for example, 161 times (by transmitted light, in FIG. 1 below) they appear as clusters of randomly arrayed fibers, and (b) under a scanning electron microscope (abbreviated SEM) at magnifications of 360 and 380 times (in FIGS. 4 and 13) they appear much like irregular separate pieces of writing paper that were individually compressed coarsely in the hand and then allowed to rebound to the extent possible from the resilience after releasing the pressure by opening the hand.

Figure 2:
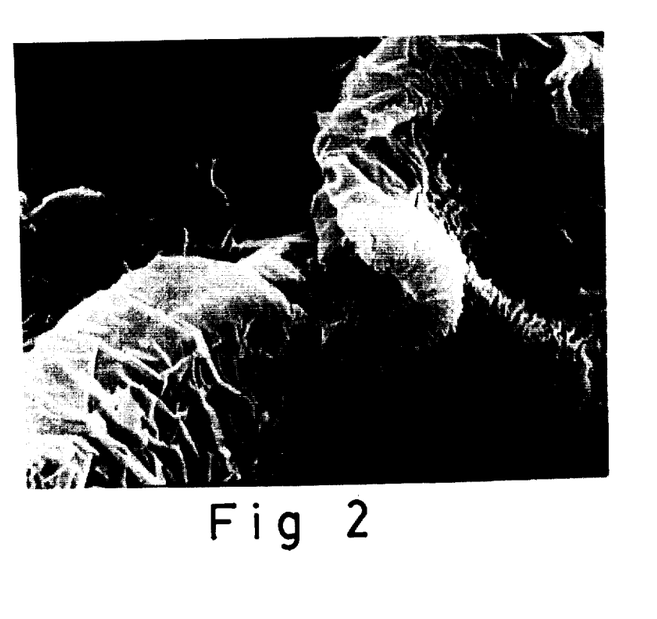
FIG. 2 is a SEM photomicrograph of the micro-bits at magnification of 4,000 times.
Figure 3:
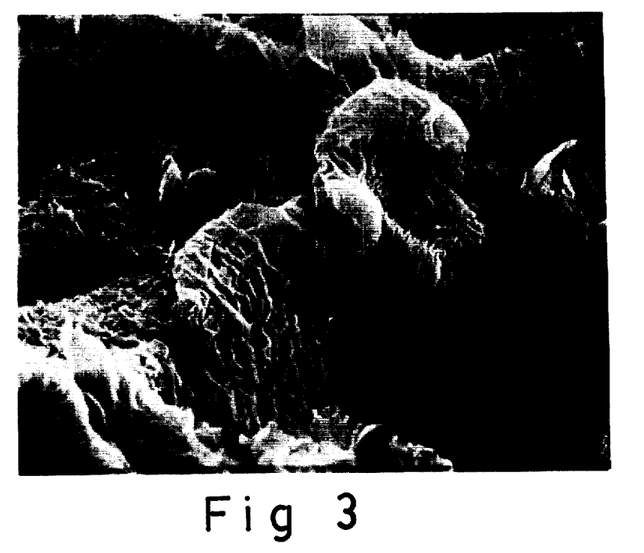
FIG. 3 is a SEM microphotograph at magnification of 1800 times of about the area that gave the lower left quarter seen in FIG. 4.
Figure 4:
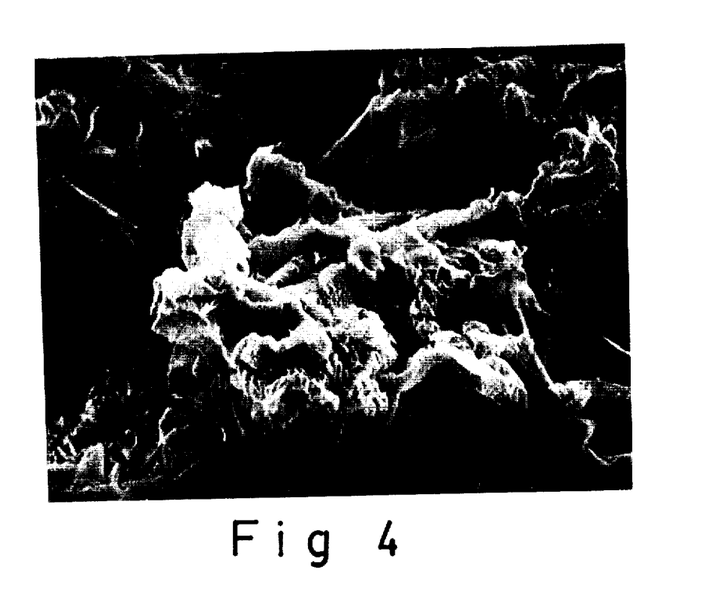
FIG. 4 is a SEM microphotograph taken at magnification of 360 times.
Figure 5:
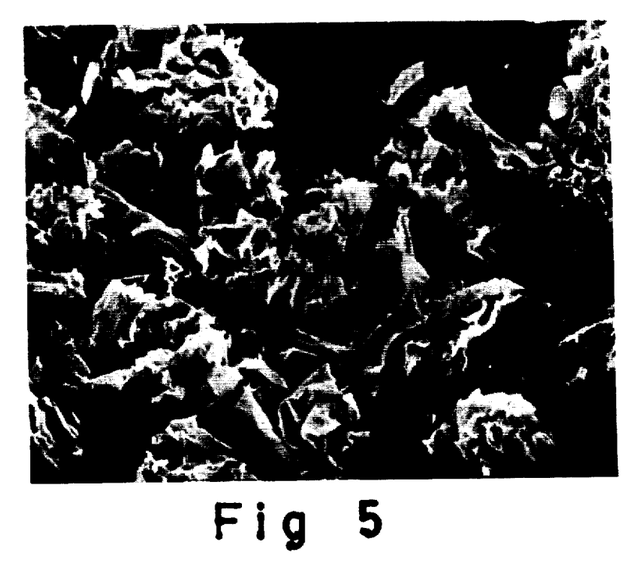
FIG. 5 is a microphotograph taken at a magnification of 100 times.
Figure 7:
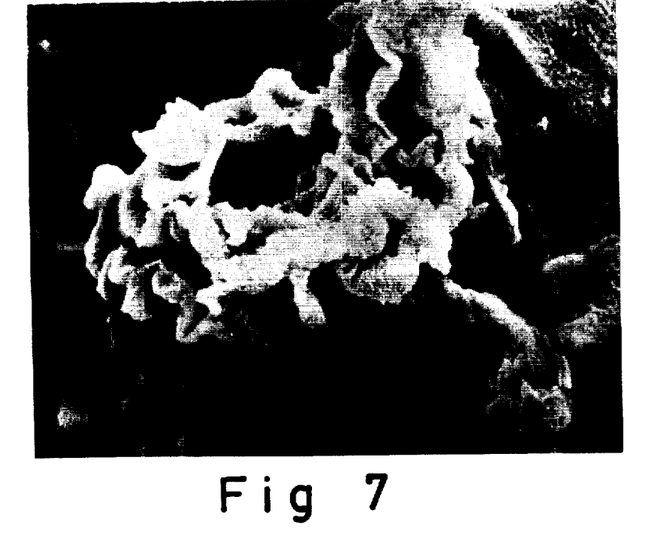
FIG. 7 is a SEM photomicrograph at 1,000 times magnification of the area that gave the delineated portion of FIG. 6.
Figure 8:
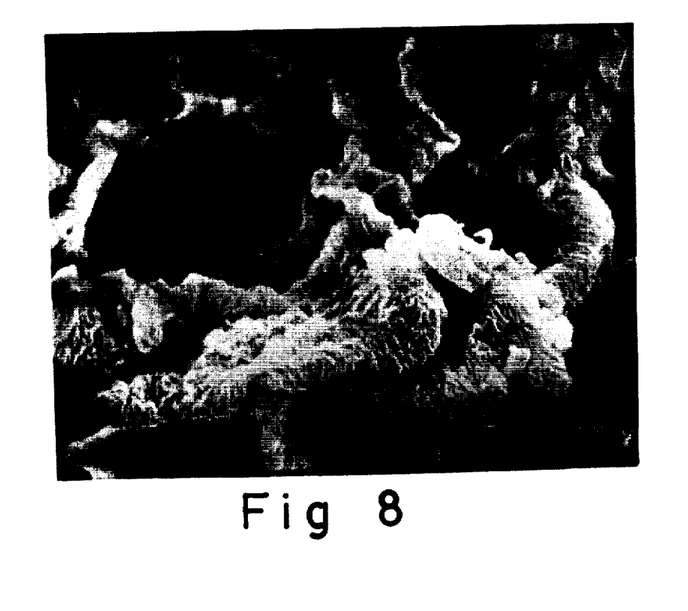
FIg. 8 is a SEM photomicrograph at magnification of 2,000 times of the area that gave the prominent right portion of FIG. 7.
Figure 9:
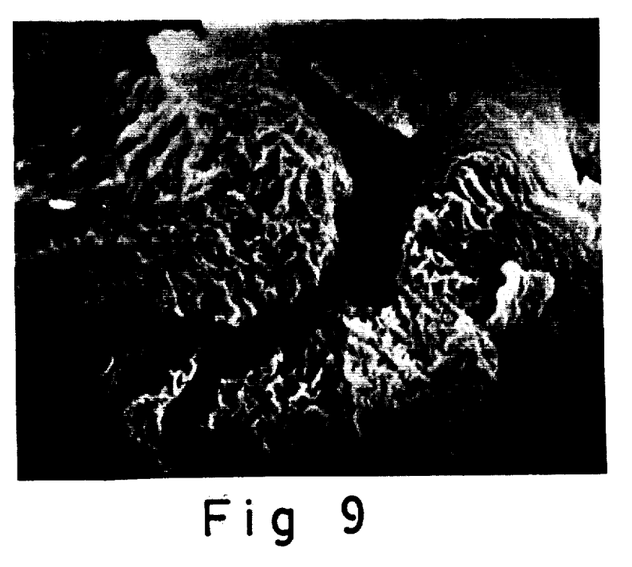
FIG. 9 is a SEM photomicrograph taken at magnification of 5,000 times and shows the area that appeared in the lower right hand quarter of FIG. 8.
Figure 10:
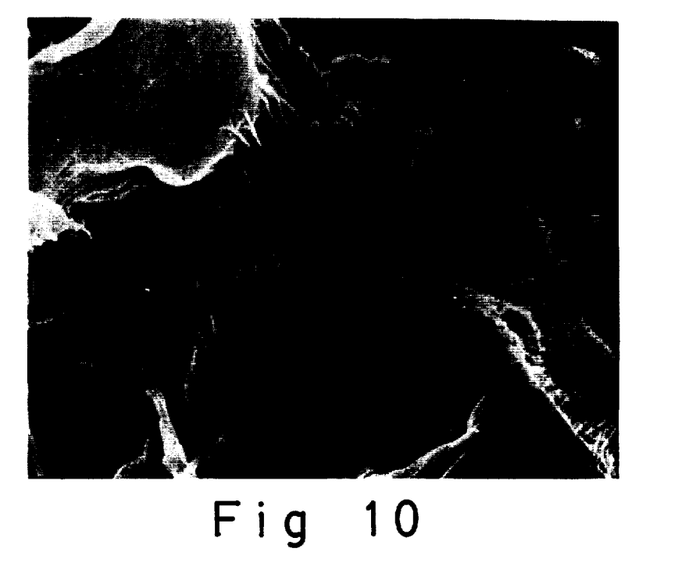
FIG. 10 is a SEM photomicrograph taken at magnification of 1000 times of polyethylene micro-bits and apparently of the location that gave the area in the lower left hand quarter of the upper right hand quarter of FIG. 13.
Figure 11:
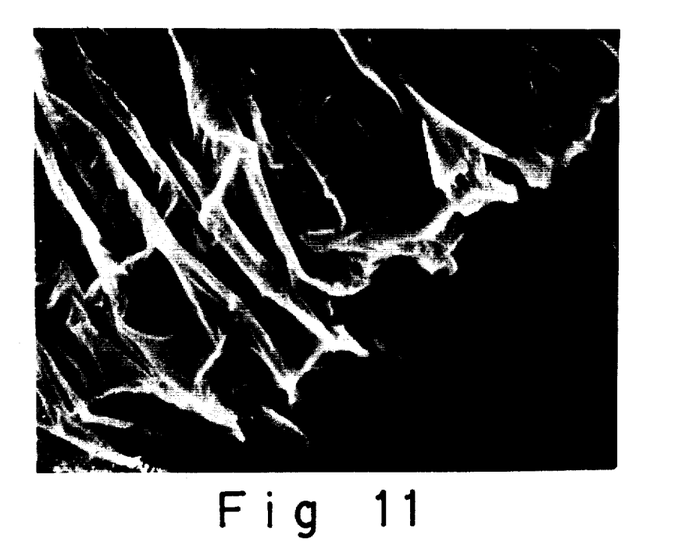
FIG. 11 is a SEM photomicrograph taken at magnification of 10,000 times and embracing the area of the slide seen in about the center of FIG. 10.
Figure 12:
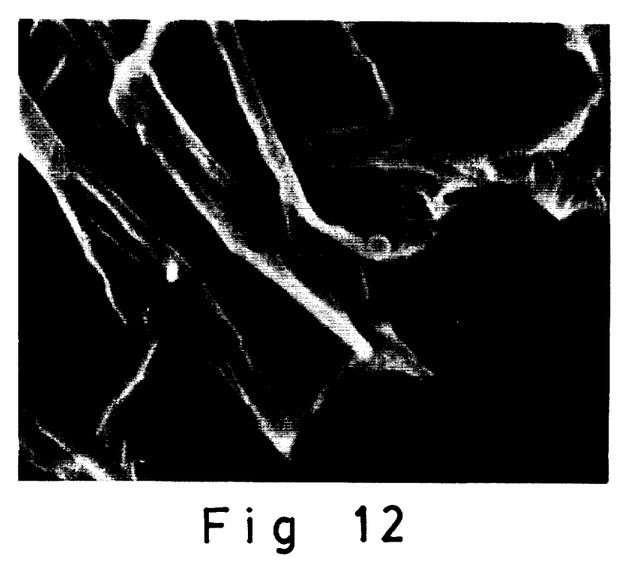
FIG. 12 is a SEM photomicrograph taken at magnification of 20,000 times and covering the area of the slide seen in lower magnification in about the middle of FIG. 11.
Figure 15:
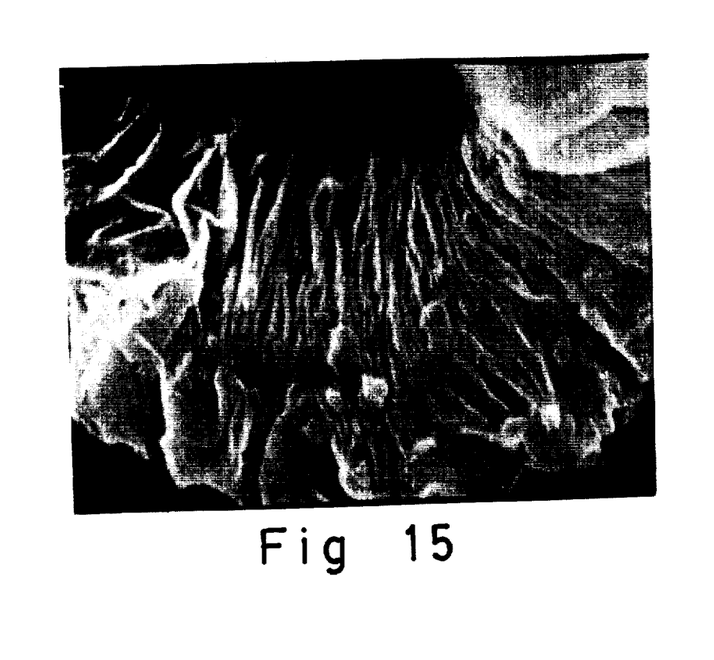
FIG. 15 is a SEM photomicrograph at magnification of 20,000 times of a portion of the polystyrene micro-bits slide viewed in FIG. 14.

Further SEM examination at other magnifications as at (i) 1800 times (in FIG. 3 below) of part of the same location as in FIG. 4 shows formations of what appear to be extended apart and distorted outlines of ruptured boundaries of what before being ruptured was an expanded honeycomb array of hexagonal and pentagonal cross sections of cells, (ii) 4000 times (in FIG. 2) shows them to appear much like that of randomly spread apart and partially overlapping not quite fully open rose petals. Other SEM magnifications ranging from 500 to 5000 times show the micro-bits to resemble minute coral formations (as in at least FIGS. 7 to 9), in wave-like appearance (magnified 1000 times as in FIG. 10), and in somewhat ruffled fluted formation (magnified 10,000 times, FIGS. 11 and 14, and 20,000 times, FIGS. 12 and 15).

The expression "styrene-polymer" embraces not only polystyrene itself but also thermoplastic polymers of any polymerizable substituted styrenes as well as copolymers of styrene with one or more other compatible polymerizable substances as the nuclear-alkylated or -halogenated styrenes such as the ring-methyl or -chlorine-substituted styrenes, or even alpha-methyl styrene, or with beta-unsaturated esters, ethers, amides, or nitriles of acrylic acid and their alpha-position-alkylated homologs, vinyl esters of aliphatic and aromatic carboxylic acids, N-vinyl compounds of N-vinylcarbazole, N-vinylimidazole or N-vinylpyrrolidone.

Such thermoplastic copolymers of styrene usually should contain at least about 50% of styrene by weight, or it may be the predominating component or at least equal in predominance to any other higher present component of any terpolymers. The copolymers of styrene include also any of the various impact polystyrene containing a major part of styrene and a minor part of a styrene-butadiene rubber (usually designated SBR, sometimes called Buna-S), for example, as produced by emulsion polymerization of about 75 parts of butadiene and about 25 parts of styrene. Thus, styrene-polymers also include styrene alloys (i.e. pressure or melt mixtures) of polystyrene with other compatible polymers generally of ethylenically unsaturated monomers.

The term "polyethylene" in the expression "an expanded polyethylene" or "a polyethylene" intends the high molecular weight (at least 6000) product and is generic as embracing low density polyethylene (specific gravity below 0.92), the high density product (sp. g. over 0.94, generally 0.941 to 0.965), and the medium density polymer product (a blend of both the high and low), as well as the impregnatable polyethylene (e.g. an extruded melt mix of polyethylene with 10% polystyrene and which can be called "polyethylene-polystyrene alloy"); all of which are available in flake or in cubes similar to polystyrene pellets.

The term "bit-pieces" includes any of the discrete free-flowing forms of any of the styrene-polymers and of any of the polyolefins from polyethylene to the polymethylpentene, such as the various sizes of granules made by cutting the respective extruded polymer into small lengths usually called pellets or crystal (as with a styrene-polymer) or pellets or cubes of a polyethylene-polystyrene alloy, the various sizes of styrene-polymer beads obtained from suspension polymerization or otherwise as by molding the particles obtained by disintegrating any of these different polymer forms, and the so-called "grind" including the coarsely ground molded polymer or waste or other scrap such polymer (of various sizes, e.g., ⅛ inch thickness, ¼ inch width, and ⅜ inch length), and any other small sized shapes of any of them.

Expandable styrene-polymer bit-pieces can be prepared by suitable known methods, for example, of preparing expandable styrene-polymer bit-pieces as disclosed in U.S. Pat. No. 2,983,692 issued May 9, 1961. Expandable polyethylene-styrene alloy can be prepared similarly.

Expanded styrene-polymer bit-pieces can be prepared from expandable polystyrene by suitable known methods. One method for preparing expanded styrene-polymer bit-pieces is by heating them, for example, with air or steam as disclosed in U.S. Pat. No. 2,983,692 (column 4 lines 65–69), "to a temperature above the softening point of the styrene polymer" as disclosed in U.S. Pat. No. 3,001,954 (column 3 lines 20–23). See also U.S. Pat. No. 3,259,594 (column 2 lines 24–27). Expanded polyethylene-polystyrene alloy bit-pieces can be prepared similarly.

Expanded bit-pieces of the polyethylene, polypropylene, polybutene or poly-methylpentene can be produced by preparing the respective expanded polyolefin by suitable known methods including incorporating into the specific polyolefin (before extruding it) a chemical foaming agent (so-called pneumatogen, usually a complex nitrogen-containing organic compound that decomposes at the extrusion temperature, liberating nitrogen) with extrusion temperature adjusted so that the pneumatogen decomposes as the polyolefin leaves the outlet of the extrusion die, as briefly described in Plastics Extrusion Technology, by Allan L. Griff, Reinhold Publishing Corp., New York, N. Y. (1968) page 221, and reducing the expanded polyolefins into bit-pieces by cutting or otherwise.

Certain physical features of the micro-bits of the invention are shown by the photomicrographs of the dry micro-bits in the first fifteen figures of the accompanying drawings, of which FIGS. 1 to 9, 14 and 15 are of polystyrene micro-bits and FIGS. 10 to 13 are of low density polyethylene micro-bits, and wherein

The expanded micro-bits of the invention are prepared by continuously feeding expanded bit-pieces of a styrene-polymer or any of the aforesaid polyolefins and water into a confined comminuting zone, having a feed inlet to it, repeatedly impelling the resulting mixture of the starting bit-pieces in the water through a circular path by repeated impact on them in the water by a plurality of impact surfaces spaced apart from one another and rotated around the axis of said circular path at from about 4700 to about 8000 revolutions per minute, and at the same time by said impact surfaces driving said expanded bit-pieces to and against corner-shaped edges of a dispersed plurality of from substantially circular orifices (a) having a diameter of from about 0.102 to about 3.175 millimeters (i.e. mm.) to substantially rectangular orifices from about 0.254 to about 3.175 mm. in width by from about 3.81 to about 12.7 mm. in length, and (b) being arranged in screening array in an arcuate plane spaced radially out of range of said impact surfaces to an extent that need be only sufficient to avoid collision between said orifices and said impact surfaces, as from about 0.508 to 1.016 mm., and thereby repeatedly tearing, ripping and shearing micro-bits of the respective expanded polymer from said bit-pieces thereof; said fed in water being so proportioned to said fed in expanded polymer bit-pieces to prevent the content of the comminuting zone from reaching a temperature that would adversely effect the integrity of said starting bit-pieces and/or the desired micro-bits.

The preparation of these micro-bits of a styrene-polymer or of a polyolefin (from a polyethylene to a poly-methylpentene), and so also the method of the invention, can be conducted by disintegrating the respective starting expanded styrene-polymer of polyolefin bit-pieces in a comminuting machine (such as that produced by Fitzpatrick Company, of 832 Industrial Drive, Elmhurst, Ill. 60126, according to their Bulletin No. 152 copyright 1968) using the broached fixed blades (identified therein by "Code DS-225") to replace the blades or other comminuting elements, mounted for rotation in the comminuting chamber model DAS06, both shown on that bulletin's page 5. That chamber is liquid-tightly capped, for example, by a cover such as shown in their Code M44D6 or Code MA44D6 (upper half of page 3 of their Bulletin 152).

That model DAS06 comminuting chamber is rectangular in horizontal cross-section and has a pair of opposed parallel entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (25.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in a knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance) The screen's overall rectangular peripheral opening has such dimensions and shape to enable it to be removably fitted in a liquid-tight engagement with the bottom of the four walls of the comminuting chamber.

The screen has staggered rows of, for example, circular holes varying in diameter as from 0.102 to about 3.175 mm. and closely spaced to one another with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4700 to about 8000 r.p.m., and more effectively from about 5000 to about 7500 r.p.m.

The micro-bits of the invention are variously applicable, for example, in filtering and improving fluids, both liquid and gaseous. That is done, for example, by admixing the selected styrene-polymer or polyolefin micro-bits into the liquid to be improved and thereafter filtering them out, or by filtering the liquid to be improved through a bed of the micro-bits. The polymer micro-bits thereby remove invisible dissolved or invisibly suspended organic material from the liquid and ordinarily leave it free from development thereof even after long standing.

To illustrate, tap water in Matawan, N.J., was filtered through a Whatman No. 2 filter paper to the extent of 473.2 cubic centimeters (i.e. cc.) into a first clean, 946.3 cc. Mason jar which then was tightly sealed. 0.4 grams of the micro-bits (prepared from expanded polystyrene bit-pieces) were wetted with about 20 cc. of this same tap water and admixed with about 473.2 cc. of the tap water and then filtered through another Whatman No. 2 filter paper into a similar second clean, 946.33. Mason jar and tightly sealed.

A week later a slight yellow haze was noted in the first jar, but the water (which had been admixed with the micro-bits) in the second jar still was perfectly clear. The yellow haze in the first jar increased in amount and in density with later settling to the bottom of the jar during observation over a period of three months. Yet the water that had been filtered through the polystyrene micro-bits into the second jar was still perfectly clear.

Illustrating use in filtering and improving a gaseous fluid, the off-white filter was removed from a commercial cigarette (Kent brand) and cut into three equal parts. One part was replaced into the innermost portion of the filter zone, dry micro-bits of expanded polystyrene were inserted into the next third of the filter zone, and another third of the original filter was replaced in the remainder of the filter zone. The cigarette was then smoked down to within a quarter inch of the filter tip.

On opening the filter zone the innermost portion of the original filter had changed from its original off-white color to only a light brown amber. The middle portion consisting of micro-bits of expanded polystyrene was black and slimy to the touch; and the outermost portion of the original filter material had not changed in color.

Comparative liquid and gas filtering results are provided by micro-bits of a polyethylene and even better on use in a cigarette filter. Micro-bits of the other polyolefins are similarly useful.

These polymer micro-bits also can be used as the packing in air filters by being admixed with suitable paper-making fibers and made up into sheets for loading into air filter frames.

Some batches of these polymer micro-bits of the invention produced, for example, by the above-described comminuting machine using a screen having circular openings of some sizes, are obtained with content of varying amounts from very little or at times up to about 20% or so of fibrous particles still finer in size than that in the ranges described earlier above, for example, down to 15 microns or to 10 microns or so in width. Generally the presence of any such amounts of these smaller sizes may not introduce any disadvantage in the particular use that is to be made of the micro-bits.

However, if need be, these finer sizes can be removed by being filtered out by available screening or other suitable means, for example, a high capacity centrifugal sifter produced by the Kason Corporation, of Newark, N.J. This involves uniformly feeding the micro-bits by a feed screw discharging into a helical paddle rotating in a horizontally positioned cylindrical sifting chamber wherein centrifugal force accelerates movement of the micro-bit particles against the sieve which is attached to its supporting basket in a manner that lets the sieve to vibrate freely.

In conducting the method of the invention, the operation conditions may cause an increase in temperature of the charge of expanded styrene-polymer or polyolefin bit-pieces being disintegrated in the comminuting zone. That may be more marked with some styrene-polymers than with others, so that in some of them the temperature rise may reach a level such that at it and higher the styrene-polymer bit-pieces would not readily or satisfactorily tear or shear under the particular operating conditions and possibly have a tendency to stretch or otherwise modify the reaction of the material being treated, and so adversely effect the desired tearing or shearing of the starting bit-pieces or what already has been torn or shorn from them. That is to be avoided, as by feeding more water with the bit-pieces.

The finished comminuted polymer micro-bits leaving the comminutor manifest the property of holding onto water to the extent of from possibly about 40 to 50 times their dry weight, and with its so held water forming a non-fluid plastic mass which is deformable and can roll, but without becoming fluid. The water is not released from this mass by draining or ordinary filtration, but requires pressure or suction, but yet it retains a significant amount of the water. For example, some high pressure reduces the mass to a water content of only about 50 percent.

The proportion of water fed into the comminuting chamber then should be at least enough for the mixture of water and produced polymer micro-bits to be sufficiently fluid readily to flow through the orifices of the screen bottom of the comminutor. Conveniently, the water should be from about 55 to about 100 times the weight of the produced expanded styrene-polymer micro-bits.

It is beneficial also to admix the starting expanded styrene-polymer or polyolefin bit-pieces with an amount of water sufficient substantially completely to wet their exposed surfaces before feeding them into the comminuting chamber.

It is advantageous also to the conduct of the method of the invention that the bit-pieces in the comminuting zone are driven by the impact surfaces alternately (i) to and against cornered edges of at least one pre-breaking or impact surface (of at least one pre-breaker bar described above, page 8 line 27 to page 9 line 2) spaced circumferentially away from said orifices and radially similarly out of range of said impact surfaces as are said orifices, and then (ii) to and against said orifices.

It is also advantageous that the impact arms be axially and angularly spaced away from one another.

For some uses to be made of these styrene-polymer or polyolefin micro-bits, they can be used with the water which is held by them or any lower amount that is retained after either or both of application of pressure or vacuum to remove as much as it is desirable to remove of that which thus can be removed.

To remove the rest of the water when dry micro-bits are desired, one way is to freeze the product having the water content left after its partial removal by pressure and/or vacuum. Then the frozen micro-bits are left, or heated, to thaw out and attain a temperature just above freezing or up to ambient, at which the still retained water then freely drains off. When all that can drain off has left, the residual water can be expressed and/or withdrawn by vacuum followed by final drying.

Another and more practical way to remove the water held by the micro-bits discharged by the comminutor is described further below in relation to the system illustrated in FIG. 16 of the drawings.

The invention is illustrated by, but not restricted to, the following examples:

EXAMPLE 1

Micro-Bits From Expanded Extruded Polystyrene Pellets 425 liters of expanding-agent-impregnated, extruded polystyrene pellets (crystal) expanded to from about 6.35 to about 12.7 mm. substantially round pellets having a bulk density of 12 grams per liter were comminuted in a comminuting machine (as described on page 7 line 4 to page 9 line 6) equipped with an input feeder 10.16 cm. in diameter by 7.62 cm. long and a bottom arcuate screen with holes of 0.1016 mm. diameter.

The rotor is set to run at 6,000 r.p.m. and the feeder set to charge the expanded polystyrene bit-pieces at the rate of 35.4 liters every 5 minutes (i.e. 425 liters per hour). The starting expanded polystyrene bit-pieces to be introduced into the feeder were wetted with sufficient water substantially completely to cover their outer surfaces. The thus wetted expanded polystyrene bit-pieces were charged into the feeder continuously at a rate of 35.4 liters every 5 minutes, while at the same time water was injected into the comminuting chamber through the two 1.6 mm. diameter jet orifices at a rate of 7.57 liters per minute.

The mixture of the expanded polystyrene micro-bits leaving the screen bottom of the comminuting chamber was collected in open drums with bottom drain plugs, wherein the free water settled to the bottom and the polystyrene micro-bits with the bound water held by them in the proportion of 2 parts of micro-bits to 98 parts of water, due to the entrapped air rose on top of the free water. The free water was drained off leaving behind a plastic mass of the (disintegrated) expanded polystyrene micro-bits in the water physically bound to them. The plastic mass weighed 255.15 kilos and contained 5.1 kilos of micro-bits with 250.05 kilos of water bound by them.

27.24 kilos of the plastic mass then placed in a close weave double cotton bag were subjected to pressure until 22.71 liters of water were expressed. The remaining 4.08 kilos containing 544 grams of expanded polystyrene micro-bits then were dried in an open dish in an oven maintained at 110° F.

In this connection, for example, micro-bits produced as in Example 1 from expanded polystyrene bit-pieces prepared from virgin (sometimes called "prime") polystyrene having a density of 1.1, showed a density of 1.0. That is 90.9 percent of the density of the original starting polystyrene crystals, from which there was prepared the expanded polystyrene bit-pieces used as the starting material from which the ultimate polystyrene micro-bits were prepared. The density of the dry micro-bits of the invention thus is substantially the same as that of the styrene-polymer from which there was prepared the expanded styrene-polymer that was used as the starting material used in preparing the aforesaid micro-bits.

EXAMPLE 2

Expanded Impregnated Polystyrene Scrap

On inch pieces of impregnated polystyrene scrap having a bulk density of 16 grams per liter were treated by the same steps as in Example 1 but fed at the rate of 28.32 liters in 6 minutes and with the rotor at 6500 r.p.m., and in the same way yielded a plastic mass like that obtained in Example 1 except for its having a lighter grayish pink hue than that of the bulk of the starting impregnated scrap.

Replacing the starting expanded polystyrene bit-pieces of each of Examples 1 and 2 by some other quantity of any other density of bit-pieces of virgin or scrap expanded polystyrene, or of any expanded styrene-acrylonitrile copolymer or of any other expanded styrene-polymer or any above described herein applicable polyolefin, and separately respectively repeating the steps of either of those examples with the same or somewhat different proportions of water or different rotor rate, provides the corresponding relatively similar micro-bits of any other expanded styrene-polymer or of any expanded above described herein applicable polyolefin. The respective corresponding additional examples are to be considered as if presented herein in completely written out form, to avoid making this specification prolix.

Figure 6:
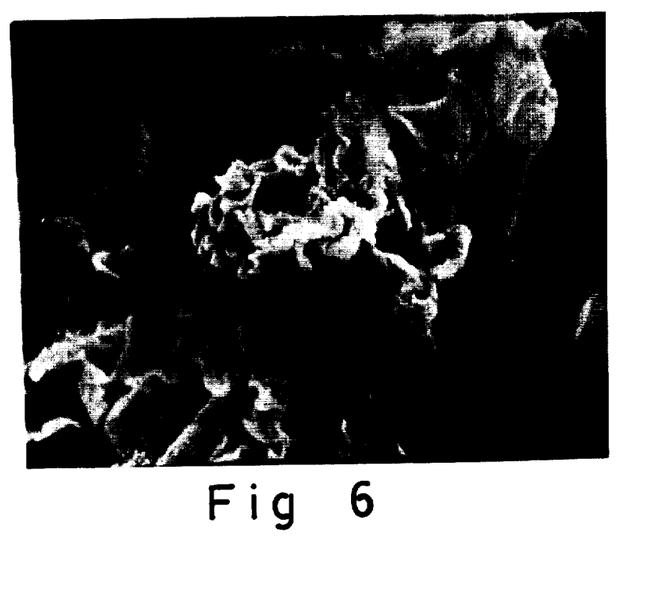
FIG. 6 is a SEM microphotograph taken at magnification of 500 times of the area that gave the delineated center portion of FIG. 5.

By replacing the screen bottom of the comminutor described above 7th and 8th paragraphs after the one describing FIG. 6 by a screen of the same overall dimensions but instead having a herring-bone array of rectangular orifices 12.7 mm. long by 0.254 mm. wide, and using the thus changed comminutor in repeating Example 1 and Example 2, the selected starting material expanded styrene-polymer bit-pieces or expanded polyolefin bit-pieces similarly yield the same type of respective end product micro-bits being to the extent of substantially completely or entirely completely 100% of from about 5 to 15 microns wide and of many varying lengths up to about 325 microns and from substantially completely to completely free of intact cells.

Hand sample paper sheets prepared by mixing the plastic mass or the thus obtained respective expanded styrene-polymer or polyolefin micro-bits (holding bound water) with a usual water suspension of bleached (wood) pulp in the usual tests made in paper-making laboratories, showed significantly great improvement in these sample sheets in tear, tensile strength, rupture resistance, opacity, bulking efficiency, and stiffness, over that of comparable sheets made from the bleached pulp alone in the same concentration as that of pulp together with the respective polymer micro-bits.

Figure 16:
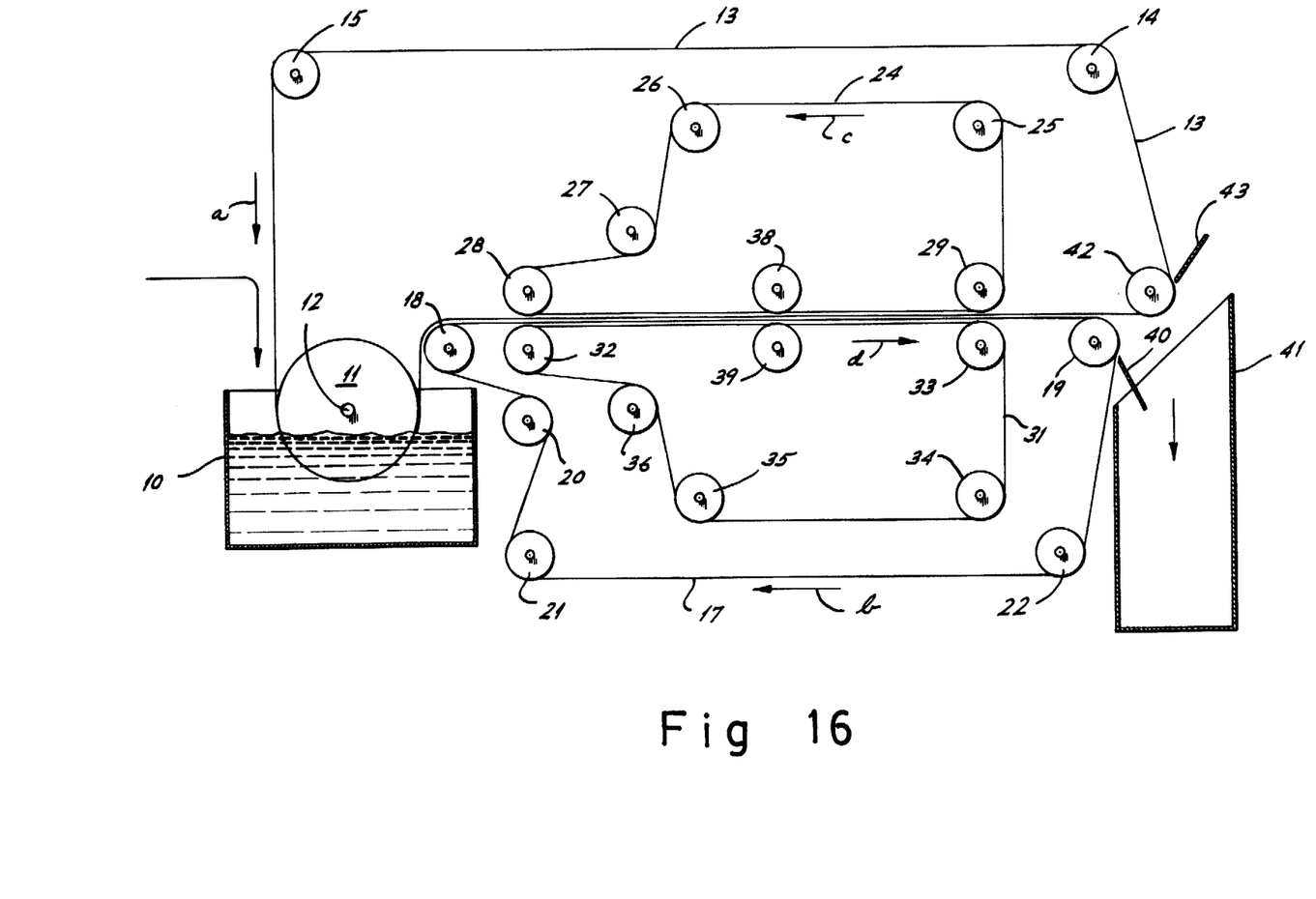
FIG. 16 is a schematic illustration of a system for removing the trapped water from the micro-bits of the invention as obtained in the aqueous slurry leaving the comminutor wherein the micro-bits are produced from the expanded starting polymer (as more fully described shortly after Example 2 below).

The at least 98 percent of water in the fluid mixture or slurry of styrene-polymer or polyolefin micro-bits in water leaving the comminutor, as from the operation of either Example 1 or 2 or any modification of them (such as provided by the second and third just preceding paragraphs), can be removed considerably to provide dry-to-the-touch chunks, cakes or mats of the respective styrene-polymer or polyolefin micro-bits having, for example, as much as 84 percent solids or more, by a water-elimination method using a system such as is schematically shown in FIG. 16.

This method of producing such dry to the touch chunks, cakes or mats of these respective polymer micro-bits from the highly aqueous slurry of them leaving the comminutor involves interposing a first foraminous carrier member (e.g. wire gauze) between said polymer micro-bits slurry and a source of vacuum and thereby to apply reduced pressure to said aqueous slurry through said carrier member to an extent at least sufficient to deposit on said carrier member a removably adhering layer or web (of practical thickness, say, about 3.2 mm.) of said micro-bits with an intermediate reduced water content low enough to enable the web to retain its continuity on said carrier member, contacting the free surface of the adhering micro-bits web with a second foraminous member thereby forming a sandwich of the micro-bits web between both said foraminous members, covering the free exposed side of each foraminous member with a continuous layer of water-absorbent sheet material having a greater water absorption capacity than that of said micro-bits web; then subjecting the resulting five layer assembly to pressure to enable the layers of warter-absorbent sheet material to absorb its practical capable extent of water from the micro-bits mat through the interposed foraminous member, and thereafter separating each layer of water-absorbent sheet material from its respectively contiguous foraminous member and separating each foraminous member from its respective surface of the further reduced in water content micro-bits mat, and discharging said latter mat.

A feature of this method is that it can be operated continuously in that each foraminous member and water-absorbent sheet is continuous and there is included a further step of then passing each separate water-absorbent material sheet (after the pressure-applying step) through a drying zone to rid these sheets of absorbed water to an extent to enable using them again to absorb water from successive further portions of intermediate water content reduced micro-bits mat picked up from the exit end of the vacuum application step.

Thus, with each foraminous member being continuous the first one of them is returned to the starting slurry there again under the influence of the vacuum to continue to pick up a continuous run of depositing micro-bits mat. At the same time, the second continuous foraminous member returns to the discharge end of the vacuum zone to complete the sandwiching of the continuously forming micro-bits web between the two opposed continuous foraminous members. Then in turn each of the two continuous water-absorbent sheets continuously contacts the free surface of its respective foraminous member.

The continuous pressure applied to the moving five-layer assembly enhances the continuous absorption of water from the micro-bits web into the continuously opposed water-absorbing sheets through the foraminous members from the continuous micro-bits web. This web then continuously is discharged after the withdrawal of the water-absorbent sheets followed by the separation of the foraminous members, with each water-absorbent sheet continuing on through its respective drying zone.

Referring now to FIG. 16, the slurry of micro-bits in water is discharged from the comminutor into the starting slurry-recieving tank 10. Spaced upwardly from the bottom of tank 10 and inwardly from its ends, vacuum drum 11 is mounted rotatably on its horizontal shaft 12 coaxial with vacuum drum 11, and supported outside of tank 10 on bushings (not shown) rotatably mounted on supports (not shown). A first continuous wire gauze filter screen 13 (e.g. 40 mesh, foraminous member) supported on idler rollers 14 and 15 travels in the direction shown by arrow a downwardly under and around the lower half of vacuum drum 11 where the wire gauze 13 passing through the slurry picks up a web deposit of partially water content reduced micro-bits.

A second wire gauze filter screen 17 (also 40 mesh, foraminous member) supported over rollers 18 and 19 passes over tensioning roller 20 and under guide rollers 21 and 22 in the direction shown by arrow b, thereby the intermediate water content micro-bits web adhering to filter screen 13 is sandwiched between it and filter screen 17.

A continuous water-absorbing felt sheet 24 supported on rollers 25 and 26 travels in the direction shown by arrow c under tensioning roller 27 and around guide roller 28 and there continuing to guide roller 29. Thereby the stretch of screen 13 extending over the distance between rollers 28 and 29 covers the exposed surface of wire gauze screen 13.

A second water-absorbent felt sheet 31 supported over rollers 32 and 33 travels in the direction shown by arrow d under idler rollers 34 and 35 and over tensioning roller 36, whereby felt sheet 31 for the distance between rollers 32 and 33 contacts the exposed underside of filter screen 17. That then completes the five-layered assembly of micro-bits web sandwiched between the wire gauze filter screens 13 and 17 covered by the felt sheets 24 and 31 respectively.

Intermediate the two pairs of respectively opposed idler rollers 28 and 32 and 29 and 31, this five-layered assembly passes between opposed pressure rollers 38 and 39, whereby their 56 cm. length applies a total pressure of, for example, 408 kilos (thus 7.3 kilos per centimeter, i.e. cm.) by pressure roller 38 against that assembly.

After felt sheets 24 and 31 separate at the junctions of rollers 29 and 33, the filter screens later separate as screen 17 passes down over idler roller 19. Then the micro-bits web reduced to a cake of 84 percent solids is removed from screen 17 by separator blade 40 and drops into micro-bits cake receiver 41. At the same time the first or upper filter screen 13 passes upwardly around idler roller 42 and any micro-bits cake adhering to that screen is removed from it by upper separator blade 43 and drops into micro-bits cake receiver 41.

Operating the foregoing water content reducing system with a 28 cm. in diameter and 56 cm. in length vacuum drum 11 at a speed of 10 revolutions per minute (r.p.m.) with a feed of 11.4 liters per minute of styrene-polymer micro-bits slurry (containing 2 percent of solids) from the comminutor provided a 3.175 mm. thick wet micro-bits layer, and with the foregoing 7.3 kilos per cm. pressure by pressure roller 38 gave a yield of 10.9 kilos per hour containing 84 percent of solids as styrene-polymer micro-bits.

In its respective drying zone (not shown) each water absorbent sheet can be hot air (or suitably otherwise) dried and with preliminary passage between pressure rolls when its water content is high enough that a significant part of it can be expressed.

The foregoing system and apparatus for removal from micro-bits of water or other liquid inert to them is not limited to its just above described specific use on expanded polystyrene micro-bits. The method and system also are applicable similarly to micro-bits of any of the other expanded styrene-polymers as well as to those of any polyolefin micro-bits. So also, the system is not restricted to the earlier above indicated dimensions or layout shown in the illustrative drawing, but can be modified to provide such other production capacity as is practical and variation in layout of the respective parts to meet particular requirements of plant production capacity and plant space accommodations.

The comminuting machine is not limited to the specific details of the illustrative applicable unit described at page 7 line 4 to page 9 line 6. For example, the number of comminuting arms can be varied even up to 32 in relation to the specific plant production needs and the configuration of the housing can be modified accordingly. Some variation in certain parts of the comminuting arms also are possible. Those of its features which provide the effective comminuting function should be retained while allowing some variation in other areas of these arms. Also, the pre-breaker bars are not limited, for example, to the specific length or number, for either can be varied with respect to the specific production plan and in some cases they might be omitted.

The nature of the comminuting operation and the appearance of the micro-bits as seen in FIGS. 1 to 5 show that there is no significant uniformity in the outline of the individual micro-bit particles.

The micro-bits of the invention, whether of an expanded styrene-polymer or expanded polyolefin, provide an unexpected advantage in filtration. For example, when admixed with a filter aid such as diatomaceous earth, these micro-bits surprisingly enhance not only the filtration rate but especially also the extent to which filtration can continue through the specific filter medium. This is illustrated, for example, on a plate filter press having circular frames supporting four spaced apart filter mats (of proprietary constitution) having an exposed diameter of 29.21 cm. and thus a 660 square cm. available filtration area.

Through this filter press there was fed at a starting rate of 28.4 liters per minute a paper mill waste water (containing, for example, small cellulose fibers, dissolved organic substances, alum, colloidal particles of hydrated cellulose). At the end of 3.1 hours the filtrate could leave this filter press at a rate of only about 0.4 liter per minute.

The used filter mats were replaced by fresh filter mats (of the same constitution). Through them was fed at 43.5 liters per minute a uniform suspension of 210 grams of a popular grade of filter aid quality diatomaceous earth in 11.4 liters of water until a 6.3 mm. thick layer of it was deposited on the filter mats. Promptly before cutting off the aqueous stream of filter aid, there was substituted at the rate of 43.5 liters per minute a stream of the same waste water. In about 8 minutes the discharge of filtrate from the press was completely blocked off.

The filter mats with this last deposit were replaced by fresh same filter mats and through them was filtered a uniform suspension of 150 grams of expanded polystyrene micro-bits (prepared by the method of Example 1 above) and 210 grams of fresh diatomaceous earth in 11.4 liter of water until a 6.3 mm. thick layer of the mixture of the micro-bits and filter aid earth was deposited on the filter mats.

Then promptly before turning off the stream of that mixture there was substituted at the rate of 43.5 liters per minute the same waste water and the filtration continued for about 5 hours and 50 minutes with filtrate then discharging at the rate of 2.65 liters per minute when the run was concluded at the end of the day.

The polystyrene micro-bits admixed with the diatomaceous earth in this last filtration can be replaced by micro-bits of any other expanded styrene-polymer as well as of any expanded above described herein applicable polyolefin. The diatomaceous earth can be replaced by any other similarly applicable filter aid.

That the starting styrene-polymers and polyolefin (from a polyethylene to a poly-methylpentene), the expanded bit-pieces of which are converted into the micro-bits of the invention, are thermoplastic shows that they also are extrudable.

That the micro-bits herein, even though holding a considerable amount of water (e.g. as much as about 80 percent), are said to be dry-to-the-touch means that the micro-bits when touched do not wet the fingers or the palm of the hand when held in it.

The earlier above described system for withdrawing such large content of water from the micro-bits is not limited to using a rotating vacuum drum to provide the web of high water content micro-bits to be passed through pressure rolls 38, 39 (FIG. 16). Slurry-receiving tank 10 and vacuum drum 11 and its shaft can be eliminated and rollers 18, 20 and 21 moved to about the left of the former location of tank 10 with filter screen 17 correspondingly extended.

Then the highly liquid slurry product from the comminutor is fed to a feed box (similar to the head-box from which paper pulp is fed to the fourdrinier in paper making), located above filter screen 17 (slightly to the right of roller 18) and discharging onto that screen. There the free water accompanying the micro-bits drains through the early portion of screen 17 after passing over roller 18. Before screen 17 reaches pressure rolls 38 and 39 it passes over a suction box (much like that at the fourdrinier discharge end) where part of the water held by the micro-bits is withdrawn.

Roller 15 is moved somewhat to the right so as to be located just to the right of the extension upward from roller 18. Screen 13 is shortened and maintained taut by running under a roller replacing drum 11 and positioned adjacent to wire screen 17 as it travels past the suction box. The layer of wet micro-bits started on screen 17 is sandwiched between screens 13 and 17 as they continue after roller 18 to and through the nip between pressure rolls 38 and 39.

Water-absorbent sheets 24 and 31 beneficially are of cotton felt but can be of any other suitable water-absorbent sheet material having a greater affinity for water than the apparent surface tension holding the water to the micro-bits.

While the invention has been explained by detailed description of certain specific embodiments of it, it is understood that various modifications and substitutions may be made in them within the scope of the appended claims which are intended also to cover equivalents of these embodiments.

What is claimed is:

1. An expanded, thermoplastic, non-brittle in its said expanded form polymer selected from
   (i) a styrene-polymer,
   (ii) a polyolefin which is a polymer member of the group of olefin homologs from ethylene to a methylpentene and having 2 to 5 carbons in its chain,
   (iii) a melt alloy of polyethylene with about ten percent by weight of polystyrene,
   (iv) a copolymer of polypropylene with from about 20 to about 30 percent of polyethylene by weight, and
   (v) a melt alloy of polypropylene in an amount exceeding 50 percent by weight of said alloy and a copolymer of polyethylene and polyvinyl acetate to the extent of up to about 30 percent, which expanded polymer is characterized by being in the form of micro-bits (a) from about 40 to about 325 microns long and from about 20 to about 325 microns wide, (b) from substantially completely to entirely completely free of intact cells of the starting expanded polymer bit-pieces from which said micro-bits were produced, (c) substantially without any uniformity in outline of the individual micro-bit particles, and (d) in density from about 85 percent of, to about substantially the same as, the specific unexpanded polymer from which there was provided the aforesaid starting expanded polymer.

2. Micro-bits as claimed in claim 1, wherein said thermoplastic polymer is a styrene-polymer.

3. Micro-bits as claimed in claim 2, wherein said styrene-polymer is polystyrene.

4. Micro-bits as claimed in claim 3, wherein said expanded polystyrene is expanded prime polystyrene.

5. Micro-bits as claimed in claim 3, wherein said expanded polystyrene is expanded scrap polystyrene.

6. Micro-bits as claimed in claim 1, wherein said thermoplastic polymer is a polyolefin.

7. Micro-bits as claimed in claim 6, wherein said polyolefin is a polyethylene.

8. Micro-bits as claimed in claim 7, wherein said polyethylene is low density polyethylene.

9. Micro-bits as claimed in claim 7, wherein said polyethylene is a melt alloy with by weight about ten percent of polystyrene.

10. Micro-bits as claimed in claim 6, wherein said polyolefin is polypropylene.

11. Micro-bits as claimed in claim 6, wherein said polyolefin is a copolymer of polypropylene with from about 20 to about 30 percent of polyethylene by weight.

12. Micro-bits as claimed in claim 6, wherein said polyolefin is a melt alloy of polypropylene with a copolymer of polyethylene with up to about 30 percent of said copolymer being polyvinyl acetate, and said polypropylene exceeding at least 50 percent of said melt alloy, said percentages being by weight.

13. An aqueous slurry of the micro-bits as claimed in claim 1, which slurry contains by weight from about one to about two percent of said micro-bits.

14. An aqueous slurry as claimed in claim 13, wherein said thermoplastic polymer is a styrene-polymer.

15. An aqueous slurry as claimed in claim 13, wherein said thermoplastic polymer is polystyrene.

16. Micro-bits as claimed in claim 1, which are dry-to-the-touch and contain by weight from about 16 to 100 percent of solids as micro-bits and the balance being substantially only water.

17. Micro-bits as claimed in claim 16, wherein said thermoplastic polymer is a styrene-polymer.

18. Micro-bits as claimed in claim 17, wherein said thermoplastic styrene-polymer is polystyrene.

* * * * *